(12) United States Patent
Barefoot et al.

(10) Patent No.: US 6,581,919 B2
(45) Date of Patent: Jun. 24, 2003

(54) SHOCK ABSORBING SEAT POST

(75) Inventors: Darek C. Barefoot, Grand Junction, CO (US); David R. Warnick, Grand Junction, CO (US); Thomas A. Hochanadel, La Folette, TN (US); Timothy A. Fry, Grand Junction, CO (US)

(73) Assignee: Eko Sport, Inc., Grand Junction, CO (US)

( * ) Notice: Subject to any disclaimer, the term of this patent is extended or adjusted under 35 U.S.C. 154(b) by 0 days.

(21) Appl. No.: 10/223,167

(22) Filed: Aug. 20, 2002

(65) Prior Publication Data

US 2003/0034596 A1 Feb. 20, 2003

Related U.S. Application Data

(60) Provisional application No. 60/313,636, filed on Aug. 20, 2001.

(51) Int. Cl.[7] .................................................. B62J 1/02
(52) U.S. Cl. ........................................ 267/132; 267/131
(58) Field of Search .......................... 267/34, 120, 131, 267/132; 188/319.2

(56) References Cited

U.S. PATENT DOCUMENTS

| 593,631 | A | | 11/1897 | Wood | |
|---|---|---|---|---|---|
| 3,656,593 | A | * | 4/1972 | Bauer | 188/300 |
| 4,789,176 | A | | 12/1988 | Carroll | |
| 5,273,259 | A | * | 12/1993 | Bauer et al. | 267/64.12 |
| 5,628,496 | A | | 5/1997 | Chamberlin | |
| 5,855,363 | A | | 1/1999 | Svendsen | |
| 5,881,988 | A | | 3/1999 | Liu | |
| 6,168,142 | B1 | | 1/2001 | Bolukbasi et al. | |
| 6,360,858 | B2 | * | 3/2002 | Gonzalez et al. | 188/319.2 |

* cited by examiner

*Primary Examiner*—Christopher P. Schwartz
(74) *Attorney, Agent, or Firm*—Jason H. Foster; Kremblas, Foster, Phillips & Pollick

(57) ABSTRACT

A seat post for a cycle has inner and outer members that are slidably mounted together forming a variable volume chamber. The variable volume chamber communicates with a fixed volume chamber in the inner member through orifices and a check valve. Slots are formed in the inner member, and a pin extends from the outer member through the slots. A cushion at one end of the slots prevents hard top-out.

15 Claims, 3 Drawing Sheets

SHOCK ABSORBING SEAT POST

CROSS-REFERENCES TO RELATED APPLICATIONS

This application claims the benefit of U.S. Provisional Application No. 60/313,636 filed Aug. 20, 2001.

STATEMENT REGARDING FEDERALLY-SPONSORED RESEARCH AND DEVELOPMENT (Not Applicable)

REFERENCE TO AN APPENDIX (Not Applicable)

BACKGROUND OF THE INVENTION

1. Field of the Invention

This invention relates generally to suspension components on bicycles, and particularly to a bicycle seat post which also functions as a shock absorber.

2. Description of the Related Art

The most common design for a bicycle has a quadrangular frame to which a wheel is affixed in the rear and a steering assembly, fork and wheel are attached in front. Just forward of the rear wheel a tubular post, usually called a seat post, is inserted at its lower extremity into a tube in the bicycle frame, and the upper extremity of this post is attached to a saddle on which the rider sits.

On some bicycles, especially those designed for off-road use, shock absorbing components have been incorporated into the frame and front fork. Most commonly these consist of elastomeric springs, coil springs or gas springs, often paired with hydraulic damping means to create shock absorbers similar to those used in motorized vehicles. These shock-absorbing components are usually located in telescoping legs of the front fork and as a spring/shock absorber for the rear part of the bicycle, interposed between the main part of the bicycle frame and a pivoting rear frame member.

Additionally, seat posts have been designed which absorb road shock that would otherwise be transmitted from the frame to the bicycle saddle. Some of these posts consist of two telescoping members with a spring mounted inside and between them in such a way as to resist compression. In others the saddle is mounted to a pivoting linkage which swings down and to the rear while maintaining the saddle in a level position. Between or adjacent to the members of this linkage a spring means is attached in order to absorb jounce and return the saddle and rider to their normal positions.

Shock absorbing seat posts or suspension seat posts lack some of the advantages of shock absorbers integrally incorporated into the bicycle frame. For example, an integrated rear shock absorber can control bouncing and thereby improve traction of the rear wheel even when the rider is pedaling out of the saddle, a function which, by virtue of its location, a suspension seat post cannot duplicate.

Suspension seat posts have their own advantages, however. Unlike integral rear shock absorbers, suspension seat posts need not be incorporated into the bicycle at the design and manufacture stages nor do they require the same relatively expensive mechanical accommodations. Suspension seat posts typically can be manufactured for the same or lower cost as compared with integral rear shocks and can be fitted to a wide variety of bicycles either during manufacture or later as an aftermarket accessory. Functionally, they are capable of absorbing those jounces which are most uncomfortable to the rider and which occur when the rider is in the usual seated position.

In spite of their potential for improving rider comfort and control and for reducing fatigue, in practice suspension seat posts have suffered from design limitations. In order to fit the most widely used type of bicycle frame, seat posts are confined to a maximum diameter that is less than optimal. Seat posts generally must mount at a rearward leaning angle and must prove durable under repeated hard jouncing given a realistic range of rider weights. At the same time there is a general concern with the weight of the bicycle and its parts which limits choice of materials. Additionally, telescoping seat posts must contain a substantial mechanical means for maintaining rotational alignment between inner and outer members given the rotational torque that a rider may generate at the saddle.

These limitations have led designers of suspension seat posts for the most part to employ elastomeric springs manufactured so as to have a relatively linear response to load and sluggish rebound characteristics, and which therefore have no need for a separate damping means. These springs may be used by themselves or in combination with a coil spring to similar effect. While compatible with the space restrictions inherent in seat posts, devices which rely on elastomeric materials are generally acknowledged to be less effective at absorbing jounce and vibration than either coil or gas springs which make use of gas or hydraulic damping.

As noted above, the two members of a telescoping post have a restriction on their outer diameter due to the need for insertion into common bicycle frame tubes. At the same time, a restriction on the relative difference in diameter between inner and outer telescoping members is imposed by strength requirements. Available annular space between the tubes therefore is minimal.

A difficulty arises with respect to the close fit between telescoping members because of two factors. The first of these is the need for rotational rigidity between the members as already noted. The second is the need to provide cushioning for any gas spring upon re-extension after compression, what is commonly called "top out." The most widely used means for maintaining rotational rigidity in telescoping seat posts consists of two opposed vertical keyway slots on the inside diameter of the lower or outer member. Mating "keys" or plugs fit into opposing cavities on the outside of the upper or inner telescoping member, after which the inner and outer members slide together in such a way that the keys engage the slots. The outer member typically has threads on its outside top end to accept a threaded cap with an inwardly protruding lip that abuts the outside of the inner post member. When the two members are engaged and the cap is screwed down, the members cannot be extended past the point where the keys contact the lip of the cap. This point of contact is effectively the "top out" or extension stop for this type of telescoping design. The only space available to insert a cushion to prevent hard top out contact is the very small annular space between the telescoping members.

In the case of elastomeric springs or elastomer/coil combinations, the amount of extensive force exerted by the spring as it reaches the limit of extension is small. The limited space available is sufficient to contain a means for cushioning top out action when such springs are used. By its nature a telescoping gas spring exerts a much stronger force against whatever mechanical means acts as the extension stop. This force is sufficient to overcome any top out cushioning means located in the space between the two telescoping members.

The top out action of the gas spring may be controlled by making the spring a self-contained mechanical assembly inside the post instead of making it integral to the post. Top out cushioning can then be incorporated internally to this self-contained unit. This requires the use of higher, less practical gas pressures due to the necessarily smaller shaft and piston sections in the spring unit, or else supplementing of the gas spring by putting it in series with a coil spring. This also requires the expense of a separate containment vessel along with additional mechanical parts. Weight is increased, thereby negating part of the advantage of the gas spring design.

An alternate method for maintaining rotational alignment and arresting extension of the telescoping members is to fix a pin or plug of rigid material across the inside diameter of the outer member. This pin traverses an elongated slot extending through the inner member. The slot moves up and down over the pin during compression and extension. The extension stop is the lower extremity of the slot. When the inner member extends upward to the point where the bottom of the slot contacts the underside of the pin, top out occurs. Prior application of this design incorporates no provision for top out cushioning sufficient for use with an integral gas spring.

The need therefore exists for a telescoping seat post that has the performance and weight advantages of an integral fluid or gas-damped gas spring, including sufficient means for cushioning top out on re-extension.

BRIEF SUMMARY OF THE INVENTION

The invention is a seat post for mounting between a frame and a seat of a cycle. The seat post comprises an outer member having a cylindrical bore defined by a sidewall. The sidewall has an inner cylindrical surface and a floor at one end of the bore. An inner member has a sidewall with a cylindrical outer surface and an end forming a piston. The piston extends into the cylindrical bore of the outer member with the outer cylindrical surface of the inner member slidingly, sealingly engaging the inner cylindrical surface of the outer member. This configuration forms a variable volume chamber in the outer member defined by the inner cylindrical sidewall, the piston and the floor. A port is formed in the piston end of the inner member and opens to the variable volume chamber. A fixed volume chamber is formed in the inner member, and is in fluid communication with the variable volume chamber through an axial fluid passage and a restrictive flow orifice formed in the inner member, and both of which are in fluid communication with the port. The fluid, preferably a gas, in the fixed volume chamber can flow into the variable volume chamber only by passing through the restrictive flow orifice, the axial fluid passage and the port.

A check valve is mounted along the axial fluid passage, for allowing at least some of the fluid in the variable volume chamber to pass into the fixed volume chamber without passing through the restrictive flow orifice when the pressure in the variable volume chamber reaches a predetermined threshold. A pair of elongated slots is preferably formed longitudinally in the sidewall of the inner member.

Figure 1:
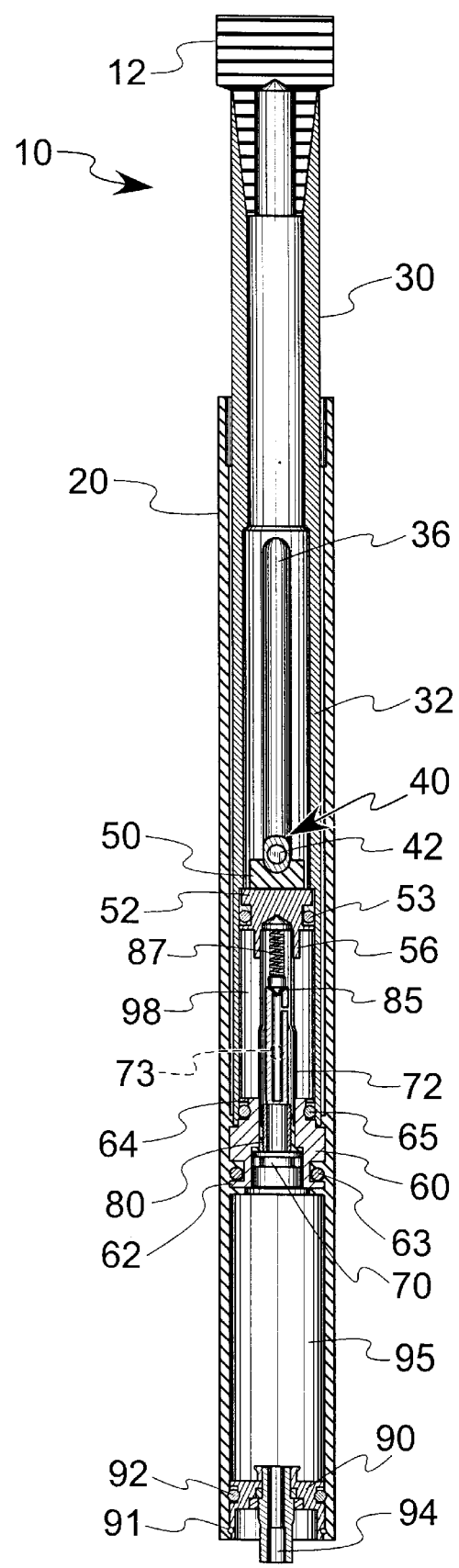
FIG. 1 is a lengthwise sectional view illustrating the preferred embodiment of the present invention in its fully extended position.

In describing the preferred embodiment of the invention which is illustrated in the drawings, specific terminology will be used. However, it is not intended that the invention be limited to the specific terms used, and it is to be understood that each term includes all technical equivalents which operate in a similar manner to accomplish a similar purpose.

DETAILED DESCRIPTION OF THE INVENTION

The preferred embodiment of the present invention is shown in FIG. 1 in its extended position. The outer member 20 of the seat post 10 engages the lower extremity 32 of the inner member 30. The upper end of the inner member is capable of receiving a fitting 12 which functions as part of a clamp assembly for a bicycle saddle. An elongated chamber 36 through the inner member slidably engages with a guide pin 40, which extends between the walls of the outer member and through a pair of aligned, elongated slots formed in the walls of the inner member. The barrel 41 of the guide pin 40 is fixed by a screw 42 to the outer member as seen in FIGS. 3 and 4.

Figure 3:
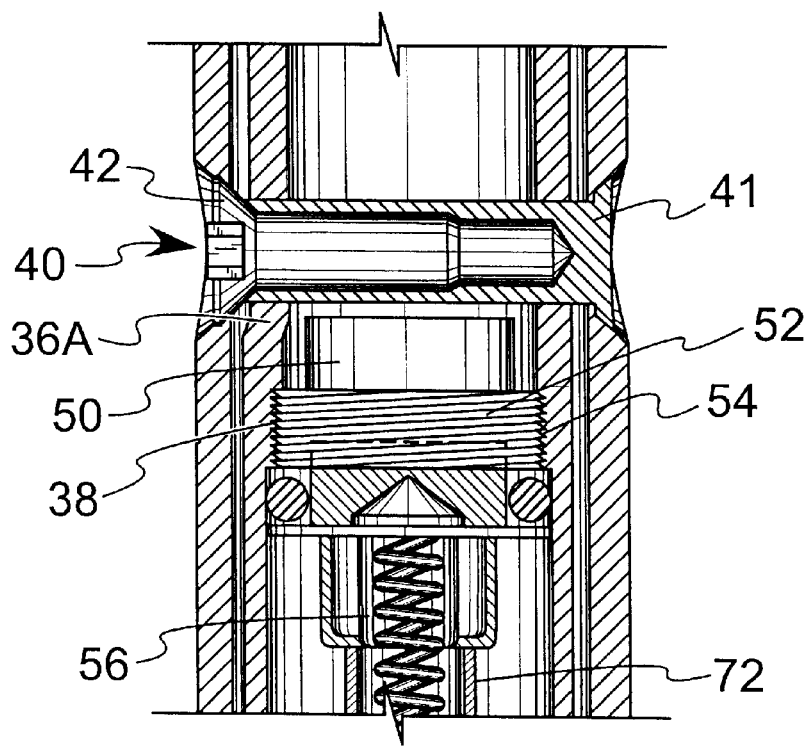
FIG. 3 is a sectional view, detail illustrating the guide pin and top out assembly.
Figure 4:
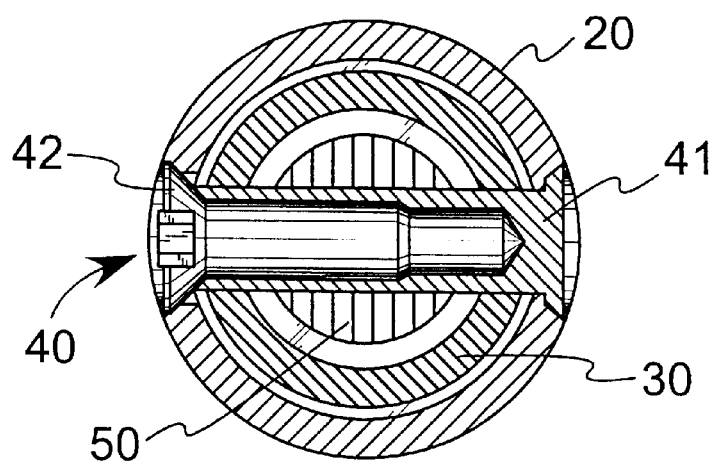
FIG. 4 is a radial sectional view illustrating the guide pin.

Referring to FIGS. 1 and 3, in the fully extended position the guide pin rests against a cushion 50 preferably of urethane, cellular urethane or a similarly compressible material positioned at one extremity of the chamber 36. The cushion 50 in turn rests against a chamber plug 52, the threads 54 of which engage the threads 38 in the inner member.

It can be seen that during compression as the inner member moves downward relative to the outer member the chamber 36 in the inner member moves downward relative to the guide pin 40 and the cushion 50 moves downward and away from the guide pin. After compression is complete and the inner member re-extends, the movement of the chamber 36 relative to the guide pin reverses direction upward, bringing the pin 40 into contact once again with the cushion 50 as the inner member resumes its fully extended position. The resistance of the cushion is such that it arrests the upward movement of the inner member before the point at which the slot's lower end 36a comes into contact with the guide pin (FIG. 3). This arrangement in which the pin 41 seats against the soft cushion 50 rather than the rigid slot end 36a allows the seat post to function as a telescoping gas spring while avoiding a hard "top out" sensation even during forceful re-extension after compression.

Figure 2:
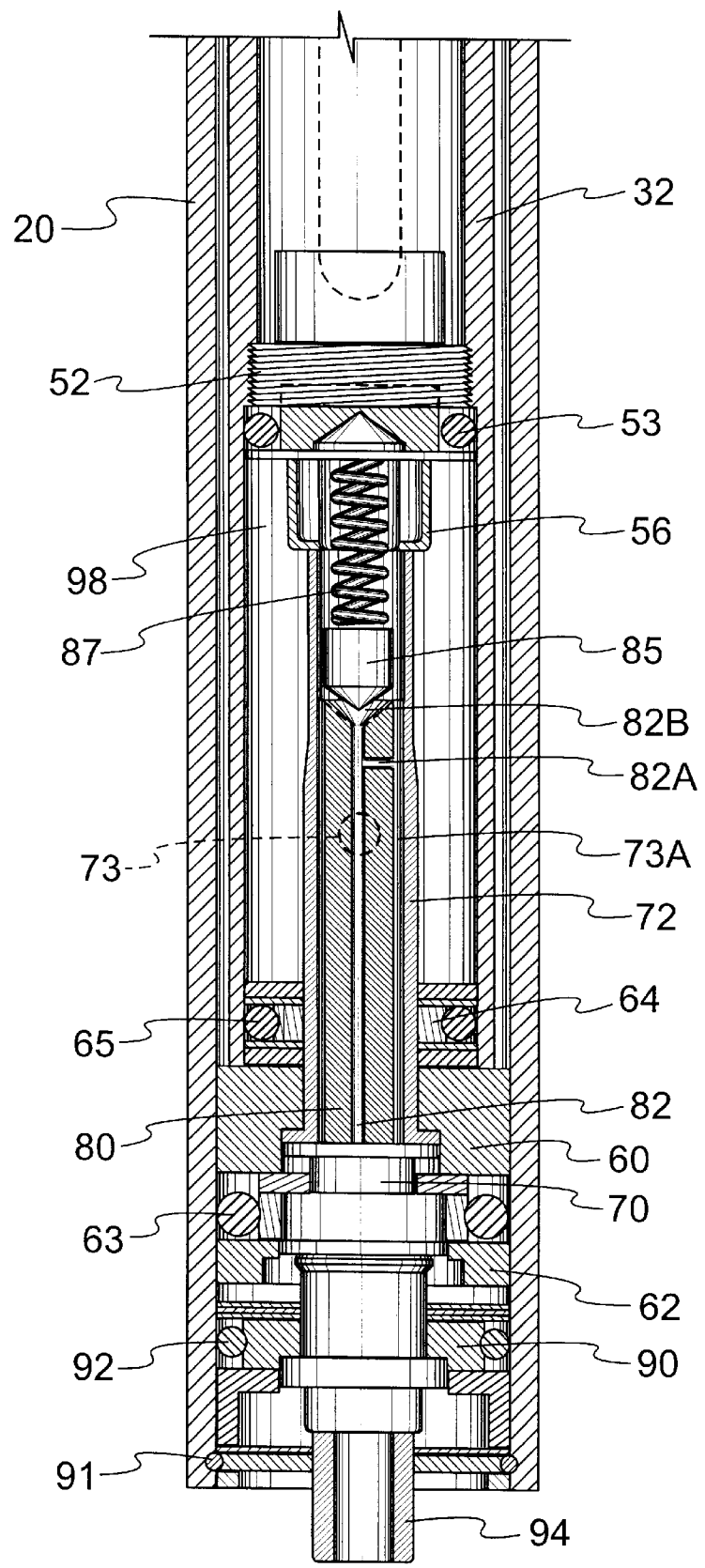
FIG. 2 is a lengthwise sectional view illustrating the lower portion of the preferred embodiment of the present invention in its fully compressed position.

Referring to FIGS. 1 and 2, the piston 60 has a large diameter end 62 which seats against the inside of the outer member and a small diameter end 64 which seats against the inside of the inner member. The piston 60 is affixed to the bottom of the inner member 32 by means of a connector 70. The barrel 72 of the connector 70 extends through the piston 60 and threads into the lower extension 56 of the chamber plug 52, thereby holding the piston 60 in place so that the piston 60 moves up and down with the inner member relative to the outer member. The piston contains an o-ring 63 on its large diameter end 62, which maintains a gas seal with the inside wall of the outer member. The piston 60 further contains an o-ring 65 on its smaller diameter end 64, which seals against the inside wall of the inner member.

Referring to FIG. 2, the connector 70 contains a port 73. The connector further contains a threaded insert 80 with an axial orifice 82. A branching orifice 82a of smaller diameter than the axial orifice 82 extends from said axial orifice 82 to the annular space 73a between the insert 80 and the connector 70. A check valve 85 is held in a seat 82b in the base of the insert 80 by means of a spring 87.

Referring to FIGS. 1 and 2, it can be seen that the main pressure chamber 95 communicates with the secondary pressure chamber 98 by means of the orifices 82 and 82a and by means of the check valve 85 through the port 73. The secondary pressure chamber 98 communicates with the main pressure chamber 95 through the port 73 and by means of the orifices 82 and 82a but not by means of the check valve 85.

Still referring to FIGS. 1 and 2, the lower end of the outer member 20 is sealed by a pressure cap 90. The pressure cap 90 contains an o-ring 92 which seats against and seals the inside of the outer member. The pressure cap 90 is affixed in the outer member by means of a retaining ring 91. The pressure cap 90 further contains a schrader valve 94 to permit convenient pressurization of the seat post. The upper end of the secondary pressure chamber 98 is sealed by an o-ring 53 on the chamber plug 52.

The main pressure chamber 95 varies in volume with downward movement of the inner member relative to the outer member, whereas the secondary pressure chamber 98 has a constant volume. During compression, gas will move upward into the fixed volume secondary pressure chamber 98 at a rate determined by the size of the axial orifice 82 and by the degree of spring pressure against the check valve 85. After the compression stroke is complete, the check valve 85 closes and pressure in the secondary chamber 98 causes gas to flow back below the piston 60 through the orifices 82 and 82a at a rate governed by the size of the branching orifice 82a. Because pressure above a predetermined level will open the check valve 85 during compression but not during re-extension, the maximum rate at which the inner member may move downward during compression is greater than the rate at which it moves upward during re-extension. This aids comfort in obvious ways.

Communication between the chambers by means of the orifices and check valve allows the post to contract and re-extend as an integral, gas-damped gas spring, while the combination of the guide pin, cushion and chamber plug eliminates hard top-out effects.

While certain preferred embodiments of the present invention have been disclosed in detail, it is to be understood that various modifications may be adopted without departing from the spirit of the invention or scope of the following claims.

What is claimed is:

1. A seat post for mounting between a frame and a seat of a cycle, said seat post comprising:
   (a) an outer member having a cylindrical bore defined by a sidewall with an inner cylindrical surface and a floor at one end of the bore;
   (b) an inner member having an end forming a piston and a sidewall with a cylindrical outer surface that slidingly, sealingly engages the inner cylindrical surface of the outer member to form a variable volume chamber in the outer member that is defined by the inner cylindrical sidewall, the piston and the floor;
   (c) a fixed volume chamber formed in the inner member and in fluid communication with the variable volume chamber through a restrictive flow orifice and a fluid passage formed in the inner member, wherein the fluid in the fixed volume chamber can flow into the variable volume chamber only by passing through the restrictive flow orifice and the fluid passage;
   (d) a check valve mounted along the fluid passage for allowing at least some fluid in the variable volume chamber to pass into the fixed volume chamber without passing through the restrictive flow orifice when the pressure in the variable volume chamber reaches a predetermined threshold; and
   (e) at least one elongated slot formed on one of the members, said at least one slot slidably receiving a guide pin that extends from the other of said members.

2. The seat post in accordance with claim 1, further comprising a cushion mounted near an end of the slot in a path of the guide pin and made of a compressible material, for the guide pin to seat against during extreme displacement of the inner member relative to the outer member.

3. The seat post in accordance with claim 1, wherein said at least one slot further comprises a pair of elongated slots formed longitudinally in the sidewall of the inner member.

4. The seat post in accordance with claim 3, wherein the guide pin extends from rigid connection to the sidewall of the outer member and extends through the elongated slots for limiting rotation of the inner member relative to the outer member and limiting the longitudinal displacement of the inner member relative to the outer member.

5. The seat post in accordance with claim 1, wherein the piston extends into the cylindrical bore of the outer member.

6. The seat post in accordance with claim 5, further comprising a port formed in the piston end and open to the variable volume chamber.

7. A seat post for mounting between a frame and a seat of a cycle, the seat post comprising:
   (a) an outer member having a cylindrical bore defined by a sidewall with an inner cylindrical surface and a floor at one end of the bore;
   (b) an inner member having a sidewall with a cylindrical outer surface and an end forming a piston, wherein the piston extends into the cylindrical bore of the outer member with the outer cylindrical surface of the inner member slidingly, sealingly engaging the inner cylindrical surface of the outer member to form a variable volume chamber in the outer member defined by the inner cylindrical sidewall, the piston and the floor;
   (c) a port formed in the piston end and open to the variable volume chamber;
   (d) a fixed volume chamber formed in the inner member and in fluid communication with the variable volume chamber through an axial fluid passage and a restrictive flow orifice formed in the inner member in fluid communication with the port, wherein the fluid in the fixed volume chamber can flow into the variable volume chamber only by passing through the restrictive flow orifice, the axial fluid passage and the port;
   (e) a check valve mounted along the axial fluid passage, for allowing at least some of the fluid in the variable volume chamber to pass into the fixed volume chamber without passing through the restrictive flow orifice when the pressure in the variable volume chamber reaches a predetermined threshold;
   (f) a pair of elongated slots formed longitudinally in the sidewall of the inner member;
   (g) a guide pin extending from rigid connection to the sidewall of the outer member through the elongated slots for limiting rotation of the inner member relative to the outer member and limiting longitudinal displacement of the inner member relative to the outer member; and (h) a cushion mounted near an end of the slots and made of a material that is compressible in its normal use, wherein the guide pin seats against the cushion when the inner member is at an extreme longitudinal displacement relative to the outer member.

8. The seat post in accordance with claim 7, wherein the cushion is preferably made of a material selected from the group of urethane and cellular urethane.

9. The seat post in accordance with claim 8, wherein the guide pin has a barrel, fixedly attached to the outer member by a screw.

10. The seat post in accordance with claim 8, wherein the piston further comprises a body having a small diameter end which is rigidly inserted into the inside of the inner member and a large diameter end slidingly inserted into the outer member.

11. The seat post in accordance with claim 8, wherein the piston has an o-ring on its large diameter end which maintains a gas seal with the inner cylindrical surface of the outer member.

12. The seat post in accordance with claim 11, wherein the piston has an o-ring on its small diameter end which maintains a seal with an inner cylindrical surface of the inner member.

13. The seat post in accordance with claim 11, wherein the piston is rigidly mounted to the inner member by a connector that threads into a chamber plug that holds the piston in place.

14. The seat post in accordance with claim 8, wherein the inner member has an end capable of receiving a fitting, which functions as part of a clamp assembly for a bicycle saddle.

15. The seat post in accordance with claim 8, further comprising a Schrader valve fixedly attached to the outer member.

* * * * *